United States Patent [19]

Smith

[11] Patent Number: 5,910,535
[45] Date of Patent: *Jun. 8, 1999

[54] WATER BASED COATING COMPOSITION HAVING SACRIFICIAL LAYER FOR STAIN REMOVAL

[75] Inventor: John Ralph Smith, Gansevoort, N.Y.

[73] Assignee: Decora, Incorporated, Fort Edward, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/642,665

[22] Filed: May 3, 1996

[51] Int. Cl.$^6$ .................................................. C08K 83/00
[52] U.S. Cl. ...................... 524/588; 427/387; 427/388.4; 428/425.5; 524/506
[58] Field of Search .................................. 524/506, 588, 524/265; 523/333, 334; 525/100, 101; 427/388.4, 387, 154, 155, 156; 428/425.5, 447

[56] References Cited

U.S. PATENT DOCUMENTS

| Re. 27,541 | 1/1973 | Morehouse | 260/448.2 |
|---|---|---|---|
| 2,260,882 | 10/1941 | Berg et al. | 134/46 |
| 3,102,038 | 8/1963 | Fisher | 106/84 |
| 3,305,504 | 2/1967 | Huntington | 428/447 |
| 3,481,767 | 12/1969 | Craven et al. | 117/76 |
| 3,505,377 | 4/1970 | Morehouse | 260/448.2 |
| 3,567,499 | 3/1971 | Klebert et al. | 117/139.5 |
| 3,887,449 | 6/1975 | Baer | 204/148 |
| 4,113,665 | 9/1978 | Law et al. | 260/37 |
| 4,146,511 | 3/1979 | Moriya et al. | 524/265 |
| 4,151,319 | 4/1979 | Sackoff et al. | 428/40 |
| 4,241,141 | 12/1980 | Dill | 428/500 |
| 4,248,751 | 2/1981 | Willing | 260/29.2 |
| 4,282,054 | 8/1981 | Mattor et al. | 156/289 |
| 4,315,957 | 2/1982 | Hereth et al. | 427/155 |
| 4,349,586 | 9/1982 | Sejournant | 427/154 |
| 4,353,745 | 10/1982 | Ebbeler | 106/2 |
| 4,571,417 | 2/1986 | Thoma et al. | 525/101 |
| 4,716,056 | 12/1987 | Fox et al. | 427/407 |
| 4,810,305 | 3/1989 | Braun et al. | 106/499 |
| 4,960,817 | 10/1990 | Spadafora | 524/440 |
| 5,039,745 | 8/1991 | Riddle | 525/101 |
| 5,049,186 | 9/1991 | Kawabata | 106/2 |
| 5,246,495 | 9/1993 | Helmstetter | 106/600 |
| 5,290,839 | 3/1994 | Hegedus et al. | 428/425.8 |
| 5,314,731 | 5/1994 | Yoneda et al. | 428/429 |
| 5,387,434 | 2/1995 | Black | 427/154 |
| 5,415,935 | 5/1995 | Pankratz | 428/352 |
| 5,514,731 | 5/1996 | Nakai | 524/265 |
| 5,578,668 | 11/1996 | Colombet . | |
| 5,631,042 | 5/1997 | Becker et al. | 427/154 |
| 5,631,310 | 5/1997 | Tooley et al. | 524/265 |
| 5,693,704 | 12/1997 | Estes | 524/387 |

FOREIGN PATENT DOCUMENTS

| 192627 | 8/1986 | European Pat. Off. | B05D 5/00 |
|---|---|---|---|
| 2630353 | 4/1988 | France | B05D 5/00 |
| 2630535 | 10/1989 | France | B05D 5/00 |
| WO9105659 | 2/1991 | WIPO | B32B 27/38 |

OTHER PUBLICATIONS

Harold Preuss *Paint Additives* 1970 Noyes Data Corp., Park Ridge N.J., 40–43 and 61–69.

*Primary Examiner*—Veronica P. Hoke
*Attorney, Agent, or Firm*—Hedman, Gibson & Costigan, P.C.

[57] ABSTRACT

A modified coating composition including a water based coating and a silicone component comprising 2 to 12 weight percent of the composition. The water based coating is preferably an acrylic latex paint. Preferably a filler is also included in the composition. The coating provides a sacrificial characteristic wherein layers may be removed with a stain or mark, leaving the coated surface looking new, using no more than soap and water.

14 Claims, No Drawings

WATER BASED COATING COMPOSITION HAVING SACRIFICIAL LAYER FOR STAIN REMOVAL

FIELD OF THE INVENTION

The present invention relates to water based coatings, such as latex paints, which are modified to aid in the removal of stains and marks thereby protecting the appearance of the coating.

BACKGROUND OF THE INVENTION

Various methods have been used to avoid damage and staining of coated surfaces. One of the earliest methods, of which adaptations are still being developed, was to place a protective coating over the coated surface.

For example, U.S. Pat. No. 2,260,882 describes the prior use of a starch and water solution applied over paint to provide a protective coating for the paint. The solution dried to almost transparent and could be removed by scrubbing off the starch with soap and water to reveal the clean paint. A fresh coat of starch solution could then be applied to maintain a fresh look to the paint for 5 or 6 years. U.S. Pat. No. 2,260,882 went on to disclose the improvement of using a Wyoming bentonite solution instead of a starch solution to provide the protective coating.

In a variation, U.S. Pat. Nos. 5,049,186 and 4,315,957 describe water based wax emulsions. The '186 patent describes having a disperse phase component formed of a petroleum fraction wax, an oxygen containing wax, an ethylene/olefin copolymer and a higher fatty acid metal salt and/or metal modified hard wax. Removal of the protective coating described in the '186 patent is called for using warm water containing an amount of solvent or steam. The wax coating of the '957 patent is described as removable with a water-steam mixture.

These types of protective coatings must be applied in an additional step, after the primary coating, i.e., paint, etc, has been applied. The protective coating must then be removed and reapplied over the paint to further protect the underlying paint.

Another method known to provide resistance to and aid the cleanup of stains and marks focused on the composition of the coating being applied. An example of such a composition intended to stand up to cleaning is described in U.S. Pat. No. 5,039,745.

In the '745 patent there is described a paint composition including a silicone resin, a polytetrafluoroethylene polymer and a polyurethane polymer each dissolved or dispersed in a liquid carrier. Due to the use of the polymers, removal of stains or marks requires the use of a solvent such as methylethylketone.

The composition of U.S. Pat. No. 4,241,141 is similarly a removable protective coating. This coating is based on a polymer composition having a significant monomer content including a soft monomer and a hard monomer, a plasticizer and a solvent. However, here again is seen a two component coating wherein the top coating is sacrificed when the stain or mark is removed.

It is therefore an object of the invention to provide a one step water based coating which provides aesthetic and stain removal qualities.

A further object is to provide such a coating with a low friction surface which resists marks.

It is a further object to provide such a coating with the advantage of sacrificial layers which can be removed without significantly affecting the appearance of the coating.

Another object of this invention is to provide a water based coating that is mildew resistant.

It is yet a further object of the invention to enable removal of the sacrificial layer including the stain with a sponge or brush and water, and no more than a brush with soap and water.

SUMMARY OF THE INVENTION

These and other objects are achieved by the present invention of a water based coating composition for application to a substrate surface comprising a water based coating and a silicone which comprises from about 2.0 to about 12.0 percent by weight of the composition An inert filler material is used to improve the ease of removal of a stain.

The water based coating can be any suitable water dispersion or emulsion and is preferably a latex paint, including most preferably an acrylic latex paint and also including urethanes. Preferably, when a pigmented latex paint is used, the pigment value content (PVC) should be in the range of from about 20% to about 70%.

The silicone is preferably a polysiloxane having limited hydroxyl functionality (ie. less than 1% solubility in water) disbursed in the water based coating with the filler. Although the invention provides the intended results when the silicone is added to the coating alone, or the silicone and filler are added to the coating separately, mixing the silicone and filler prior to addition to the coating results in better short term mixing.

DETAILED DESCRIPTION OF THE PREFERRED EMBODIMENT

In its most preferred embodiment, an acrylic latex paint having a PVC of from about 20% to about 70%, and preferably 30% to 50%, is modified with a silicone disbursed in a filler. For reasons later discussed, a matte finish paint with white or light color pigment is most preferred for best results in appearance after removal of a stain by scrubbing. Also, scrubbable paints are preferred wherein they tend to better maintain their appearance after scrubbing or abrasion.

The silicone is preferably added, in equal parts to a 50–70% slurry of the filler prior to addition to the paint. The silicone/filler slurry is added to the paint by conventional mixing. The preferred amount of silicone ranges from about 2 to about 12 weight percent of the final composition. More preferred is the use of from about 3.5 to about 9 weight percent silicone, with about 7.5 weight percent silicone being most preferred to achieve high silicone loading at the coating surface.

Referring now in greater detail to the polysiloxane material, to produce the desired advantageous properties in the presently claimed invention dispersible polysiloxanes are used. The preferred polysiloxanes are formed from monomeric units having structures (I) and (II) as follows:

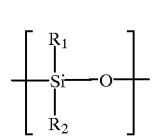

(I)

and

-continued

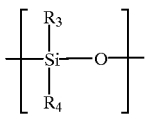
(II)

wherein $R_1$ is selected from the group consisting of:
(i) phenyl;
(ii) methyl;
(iii) tolyl;

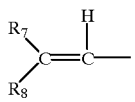
(iv)

wherein $R_7$ and $R_8$ may be the same or different and may be hydrogen, methyl, or ethyl, and wherein when $R_1$ is group (i), (ii), (iii) or (iv), the prime mole percent of structure (I) is from about 0.5 to 50 and the prime mole percent of structure (II) is from about 99.5 to 50, and (v) polyoxyalkylene having the structural formula

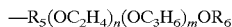
—$R_5(OC_2H_4)_n(OC_3H_6)_mOR_6$ wherein $R_6$ is hydrogen or a monovalent hydrocarbon group having from 1 to 10 carbon atoms, $R_5$ is an alkylene group having at least two carbon atoms, n and m are zero or numbers, the sum of n and m is at least 1 and the oxyalkylene unit $R_6O(C_3H_6O)_m(C_2H_4O)_n$, has a molecular weight of at least about 80, and wherein there are at least two units having structure (I) and at least three units having structure (II) and wherein the oxyalkylene unit constitutes from about 85 to 30 weight percent of the polysiloxane polymer; $R_2$ may be methyl, ethyl, or phenyl; and $R_3$ and $R_4$ may be the same or different and may be methyl or ethyl.

A preferred class of polysiloxanes are those wherein $R_1$ is the polyoxyalkylene unit described hereinabove. Methods for preparing this class of materials are described in U.S. Pat. No. 3,505,377 and U.S. Pat. No. Re. 27,541, both of which are incorporated herein by reference.

Particularly preferred in this class is a hydrolytically stable silicone surfactant composition containing a dimethylsiloxane-oxyalkylene block copolymer wherein the oxyalkylene unit of the copolymer contains oxyethylene and oxypropylene units These compounds preferably possess a molecular weight of at least about 1500 and in the structural formula, $R_6$ is a monovalent hydrocarbon group having from 1 to 10 carbon atoms. Generally, the oxyalkylene unit comprises about 15 to 60 weight percent oxyethylene units and there are at least about three units having structure (I) and at least about 40 units having structure (II).

Most preferably in this embodiment, $R_2$, $R_3$ and $R_4$ are methyl and the polysiloxane possesses a viscosity at room temperature of about 2000 to 2600 cps. as measured with a #4 spindle at 30 rpm.

Another preferred class of polysiloxanes wherein $R_1$ is the polyoxyalkylene group described hereinabove are those wherein $R_6$ is hydrogen. This means that the polyoxyalkylene unit is capped with a hydroxyl group at its terminus (herein referred to as hydroxy capped).

Generally, the oxyalkylene unit is composed of oxyethylene and/or oxypropylene segments and it possesses a molecular weight in the range from about 80 to 660. The weight percent of the OH groups is preferably in the range from about 0.9 to 4.5. These materials exhibit viscosities in the range from about 40 to 45 centistokes.

Still another class of polysiloxanes are those wherein $R_1$, $R_2$, $R_3$ and $R_4$ are methyl and the terminal group at the ends of the polysiloxane chains are hydroxy capped oxyalkylene units having a molecular weight in the range from about 120 to 700. The oxyalkylene portion of the terminal group can be either oxyethylene or oxypropylene segments.

In all cases wherein an oxyalkylene group is connected to a silicon atom in the main siloxane chain, it is attached through a non-hydrolyzable carbon-silicon bond.

It is noted that the above polysiloxanes can be referred to as either graft or block polymers, depending on the specific structure of the polymer and/or on the manner in which they are synthesized.

It is also noted that the siloxane polymers utilized as the modifiers in the present composition must be dispersible. They are, generally, not cross-linked nor do they cross-link over a period of time under normal storage conditions or in the absence of cross-linking agents.

Another class of desirable polysiloxanes useful in the present invention are those polysiloxanes wherein $R_1$ is phenyl, $R_2$ is phenyl or methyl and $R_3$ and $R_4$ are methyl. Such polysiloxanes are particularly desirable when x is from about 0.5 to 30 and y is from about 99.5 to 70.0. Generally, $R_1$ is phenyl and $R_2$, $R_3$ and $R_4$ are methyl, in accordance with the above, the preferred polysiloxane has a number average molecular weight from about 25,000 to 250,000, although here again, the prime factor in determining molecular weight is the ability to disperse or to render the polysiloxane dispersible Particularly, preferred is a polysiloxane wherein $R_1$ is phenyl, and x is about 4.5, and the number average molecular weight is about 70,000.

Also desirable are polysiloxanes having the above structural formula wherein $R_1$ is methyl. In this case, it is clear that x would equal y. Generally, such polysiloxanes have a viscosity in the range from about $60 \times 10^3$ to $20 \times 10^6$ cps.

A Another preferred polysiloxane within the scope of the above formula is that wherein $R_1$ is a vinyl group and x is from about 40 to 60 and y is from about 60 to 40 and the number average molecular weight is in the range from about $5 \times 10^5$ to $1 \times 10^6$.

As used herein, the term "prime mole percent" is the number ratio of the x type to y type siloxane units.

Such polysiloxanes as well as methods for their production are conventional and are described in detail in U.S. Pat. No. 2,560,498, the contents of which are incorporated herein by reference.

Typically, the polysiloxanes which can be used in the present invention have the structural formula:

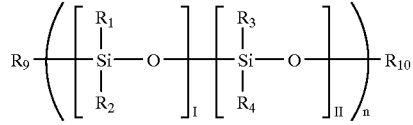

wherein $R_1$, $R_2$, $R_3$, $R_4$ and the prime mole percent or number of structural units designated I and II are as defined above. $R_9$ and $R_{10}$ are polymer chain terminal groups. In the case of relatively long length polymer chains, i.e., high molecular weight polymers, the particular groups constituting $R_9$ and $R_{10}$ are present in trace amounts. Consequently, the effect of such groups, even if they are chemically reactive, i.e., can react with certain of the other chemical entities in the polymer, is minimal, and, as a practical matter, undetectable. In such a case, while it is preferred that $R_9$ and $R_{10}$ are hydrogen or saturated lower alkyl, e.g., having 1 to 10 carbon atoms, the particular chemical nature of such terminal groups is not critical so long, of course, as the groups do not adversely affect the desired properties of the polysiloxane.

In the event that the polymer chain is of shorter length, i.e., lower molecular weight, the terminal groups will, of course, provide a correspondingly greater contribution to the overall chemical and physical properties of the polymer. This is due to the increased proportion of the overall molecular weight represented by the terminal groups. Thus, in the relatively low molecular weight polysiloxanes used in the present invention, e.g., those possessing hydroxy capped oxyalkylene units, the hydroxyl groups do play a role in the overall properties of the polymers.

The subscript "n" represents the molecular weight of the polymer and, as discussed above, is such that the polysiloxane is dispersible.

More generally, the preferred silicones are ones that are compatible with the water based coating but are insoluble in water (i.e. less than 1% solubility). A colorless liquid silicone such as dimethyl polysiloxane or a modified dimethyl polysiloxane with some hydroxy functionality is most preferred. Additionally, the silicone should have a viscosity range of from about 0.65 to about 1,000,000 centistokes with 50–1,000 centistokes being most preferred.

The polysiloxane materials utilized in preparing the composition of the present invention may be mixed or dispersed into the paint using a variety of techniques well known and conventional in the art. Thus, for example, the polysiloxane may be blended into the paint after manufacture of the paint, but prior to packaging; or at the location where the coating is to be used, either by mixing the polysiloxane and/or filler into batches of paint or metering and dispersing the polysiloxane and/or filler into the paint immediately prior to the coating step. It is thus within the skill of the art to use any of these methods to introduce the polysiloxane material and to regulate the parameters affecting the distribution, e.g., mixing speed, configuration of mixing blades, duration of mixing, etc., so as to produce a uniform dispersion.

As stated above, it has been found that the effectiveness of the silicone additive is enhanced by the addition of a filler material. The preferred filler materials are clay (i.e. kaolin), titanium oxide ($TiO_2$), talc, calcium carbonate, diatomaceous earth and mica. Most preferred is $TiO_2$, however, each has its own advantages and disadvantages For example, clay is often acceptable and is quite inexpensive. $TiO_2$ is expensive but is preferred for its opacity. Mica has good water resistance but creates a pearl-like finish.

Preferably, the amount of filler added should be between 1 and 50 weight percent of the composition with 7% weight being most preferred This is in addition to the filler often found in water based coatings. The significant factor in determining filler content is not altering the coating PVC value significantly.

The additive is preferably prepared by first disbursing the filler in water to create a 50–70% slurry. Equal parts of silicone and slurry are then mixed. In its most preferred embodiment, the modified composition comprises 7 parts silicone mixed with 7 parts slurry and 100 parts acrylic latex paint.

The composition disclosed herein provides a variety of unexpected synergistic benefits in use. Significantly, the silicone tends to migrate to the surface of the coating when applied. Loading of silicone at the surface provides the benefit of reduced frictional coefficient at the surface of the coating The result is that items, such as the edge of a coin, which would mark unmodified paint more easily slides along the surface thereby reducing marking.

Additionally, the silicone works to weaken the bond between the pigment and the latex acrylic backbone of the paint when scrubbed. Since the greater concentration of silicone tends to be at the surface, the pigment at the surface tends to break off more easily but the deeper pigments in a lower silicone loading environment become less likely to break off. Thus the lower pigment provides that the original color of the paint is maintained.

Moreover, silicone is hydrophobic, avoiding water and thereby tending to avoid mildew on or in the surface of the modified paint. Where the silicone is concentrated toward the surface where water may come into contact, the water is shed and mildew does not develop.

Perhaps most important, however, is the ability to remove the stained pigment layer with merely a wet towel, sponge or brush. The first stains or marks on a particular area tend to be more easily removed, i.e. with less scrubbing, than later stains or marks in the same area which begin to require more scrubbing and possibly the use of soap and water. However, due to the nature of the polysiloxanes used, solvents are not required as would be if known anti-graffiti compounds such as aliphatic polyurethanes were included in the composition.

Additionally, the paint component used in the present composition is most preferably a matte finish paint. This is due to the fact that when gloss paint is scrubbed or abraded the gloss tends to be worn off with the abrasion of heavy scrubbing, leaving the appearance of the surface marred or flat. With a matte finish the appearance of the surface is not affected to any substantial degree with normal scrubbing.

For similar reasons, use of dark color pigmented paints are not preferred wherein they tend to shine when scrubbed or abraded. Thus, most preferred are white pigmented paints or paints with lighter colors including pastels.

EXAMPLE I

DUTCH BOY® RENAISSANCE Confident Flat™ interior white paint was modified in successive runs with about 3.5, 5, 7.5 and 10% by weight of organo-silicone disbursed in 5 weight percent of a 70% clay filler slurry. The modified composition was painted onto a primed wall. Once dry, a permanent marker was used to mark the coating.

In different areas either a wet sponge or brush was used to remove the marks. Although the marks were removable from each of the samples having varying concentrations, the marks were easiest to remove from the composition having 7.5 weight percent silicone.

Additional trials in the same area from which a stain was previously removed revealed that after the first several marks were easily removed, removal became more difficult. Although subsequent marks were able to be removed, a brush was used instead of a sponge and in later trials soap and water was used. Even after removal of up to 10 successive marks in the same area of the 7.5% silicone modified sample, the paint color was acceptable in appearance, having no significant change from adjacent areas.

EXAMPLE II

DUTCH BOYS® RENAISSANCE white satin exterior paint was modified with organo-silicone added in successive trials from 1 to 15 weight percent disbursed in a kaolin clay filler comprising 5 weight percent of the composition. The optimum silicone addition was about 7% by weight.

This paint worked very well because it is scrubbable, thereby maintaining its appearance despite scrubbing (abrasion) during testing.

The samples were also subjected to several water tests without visible change in appearance. One was conducted with water run over the sample for a period of about one week at approximately 40 lbs. pressure. Another was subject to a moisture chamber at 95–100% for a period of two weeks. A third was placed in a beaker of water for approximately three weeks. The visual quality was maintained due to the high loading of silicone at the surface, which is hydrophobic.

Various modifications to the above invention will become apparent to those skilled in the art, all of which are intended to fall within the spirit and scope of the present inventiong limited only by the appended claims. All references cited herein are hereby incorporated by reference.

I claim:

1. A modified coating composition for application to a substrate surface comprising:
   a) an acrylic water based latex paint composition with a pigment value content in the range of from about 20% to about 70%; and
   b) about 2 to about 12% of the weight of the composition of a polysiloxane that is less than 1% water soluble and formed from monomeric units having structures (I) and (II) as follows:

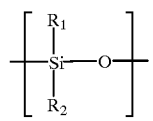

(I)

and

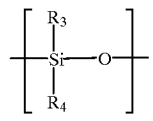

(II)

wherein $R_1$ is selected from the group consisting of:
   (i) phenyl;
   (ii) methyl;
   (iii) tolyl; and

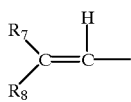

(iv)

$R_2$ is methyl, ethyl or phenyl, $R_3$ and $R_4$ are methyl or ethyl and $R_7$ $R_8$ are hydrogen, methyl, or ethyl wherein the modified coating composition when applied to the substrate surface comprises sacrificial layers that can be removed by use of a sponge or brush and water without significantly affecting the appearance of the coating.

2. A modified composition as defined in claim 1 wherein the polysiloxane is a dimethyl polysiloxane or a modified dimethyl polysiloxane with about 1 mole percent hydroxy functionality.

3. A modified coating composition as defined in claim 1 further comprising a filler.

4. A modified composition as defined in claim 3 wherein the filler is selected from the group consisting of clay, titanium oxide, talc, calcium carbonate, diatomaceous earth and mica.

5. A modified coating composition as defined in claim 1 wherein the pigmant value content is about 30% to about 50%.

6. A modified coating composition as defined in claim 5 wherein the acrylic latex paint is a matte finish paint.

7. A modified coating composition as defined in claim 1 wherein the polysiloxane comprises from about 3.5% to about 9% of the composition by weight.

8. A method for removal of stains and marks from a surface coated with the modified coating composition of claim 1 comprising the steps of washing the surface with soap and water and removing sacrificial layer of the coating composition.

9. A method of muanufacture of a modified coating composition having sacrificial layers for stain removal which can be removed by use of a sponge or brush and water without significantly affecting the appearance of the modified coating comprising:
   a. creating a 50% to 70% slurry of a filler in water;
   b. adding 2 to 12% weight percent of a polysiloxane that is less than 1% soluble in water and formed from monomeric units having structures (I) and (II) as follows:

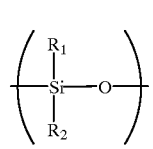

(I)

and

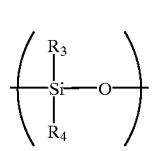

(II)

wherein $R_1$ is selected from the group consisting of:
   (i) phenyl;
   (ii) methyl;
   (iii) tolyl; and

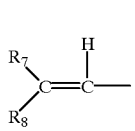

(iv)

$R_2$ is methyl, ethyl or phenyl, $R_3$ and $R_4$ are methyl or ethyl and $R_7$ $R_8$ are hydrogen, methyl, or ethyl to the slurry to create a polysiloxane/filler/slurry; and
   c. adding the polysiloxane/filler/slurry to an acrylic water based latex paint composition with a pigment value content about 20% to 70%.

10. A modified coating composition for application to a substrate surface consisting of:
   a) a water based acrylic latex paint with a pigment value content in the range of from about 20% to about 70%;

b) a filler; and c) about 2 to about 12% of the composition by weight of a polysiloxane that is less than 1% soluble in water and formed from monomeric units having structures (I) and (II) as follows:

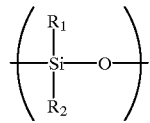
(I)

and

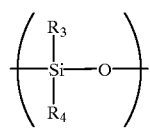
(II)

wherein $R_1$ is selected from the group consisting of:

(i) phenyl;

(ii) methyl;

(iii) tolyl; and

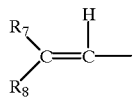
(iv)

$R_2$ is methyl, ethyl or phenyl, $R_3$ and $R_4$ are methyl or ethyl and $R_7$ $R_8$ are hydrogen, methyl, or ethyl wherein the modified coating composition when applied to the substrate surface comprises sacrificial layers that can be removed by use of a sponge or brush and water without significantly affecting the appearance of the coating.

11. A modified coating composition as defined in claim 10 wherein the pigment value content is about 30% to about 50%.

12. A modified coating composition as defined in claim 10 wherein the polysiloxane comprises from about 3.5% to about 9% of the composition by weight.

13. A modified composition as defined in claim 10 wherein the filler is selected from the group consisting of clay, titanium oxide, talc, calcium carbonate, diatomaceous earth and mica.

14. A modified composition as defined in claim 10 wherein the polysiloxane is a dimethyl polysiloxane or a modified dimethyl polysiloxane with about 1 mole percent hydroxy functionality.

* * * * *